US012645623B2

(12) United States Patent
Sethuram et al.

(10) Patent No.: US 12,645,623 B2
(45) Date of Patent: Jun. 2, 2026

(54) STREAMING SCAN NETWORK LATENCY BALANCING TO REDUCE COST OF TESTING IDENTICAL REPLICATED BLOCKS

(71) Applicant: QUALCOMM Incorporated, San Diego, CA (US)

(72) Inventors: Rajamani Sethuram, San Jose, CA (US); Ramanathan Bhagavathiperumal, Fremont, CA (US); Surya Sasi Kiran Tallapragada, Folsom, CA (US)

(73) Assignee: QUALCOMM Incorporated, San Diego, CA (US)

( * ) Notice: Subject to any disclaimer, the term of this patent is extended or adjusted under 35 U.S.C. 154(b) by 82 days.

(21) Appl. No.: 18/679,292

(22) Filed: May 30, 2024

(65) Prior Publication Data

US 2025/0370944 A1 Dec. 4, 2025

(51) Int. Cl.
*G06F 13/36* (2006.01)
*H04L 49/00* (2022.01)

(52) U.S. Cl.
CPC .......... *G06F 13/36* (2013.01); *H04L 49/3063* (2013.01); *G06F 2213/40* (2013.01)

(58) Field of Classification Search
CPC ... G06F 13/36; G06F 2213/40; H04L 49/3063
See application file for complete search history.

(56) References Cited

U.S. PATENT DOCUMENTS

| | | | |
|---|---|---|---|
| 5,809,552 A | | 9/1998 | Kuroiwa et al. |
| 7,707,472 B1 * | | 4/2010 | Dastidar ................ G11C 29/16 |
| | | | 714/733 |
| 10,168,386 B2 * | | 1/2019 | Antony ................... G06F 30/00 |
| 11,257,562 B2 * | | 2/2022 | Tan .......................... G06F 11/27 |
| 11,639,962 B1 * | | 5/2023 | Patel ............... G01R 31/31704 |
| | | | 714/726 |
| 12,181,522 B2 * | | 12/2024 | Hoefler ........... G01R 31/31722 |
| 12,300,338 B2 * | | 5/2025 | Chen ...................... G11C 29/32 |
| 2017/0328951 A1 * | | 11/2017 | Liew .................. G01R 31/3187 |
| 2022/0317975 A1 * | | 10/2022 | Li ........................... G06F 7/584 |

(Continued)

FOREIGN PATENT DOCUMENTS

WO 2023164659 A1 8/2023

OTHER PUBLICATIONS

International Search Report and Written Opinion—PCT/US2025/022721—ISA/EPO—Jul. 11, 2025.

*Primary Examiner* — Henry Tsai
*Assistant Examiner* — Christopher A Daley
(74) *Attorney, Agent, or Firm* — Patterson + Sheridan LLP

(57) ABSTRACT

Certain aspects of the present disclosure provide techniques and apparatus for latency balancing in a streaming scan network (SSN) on an integrated circuit. Embodiments include receiving, at a programmable block on the integrated circuit, an indication of a number of pipeline stages to be used for a test operation in the SSN. Embodiments include selecting, by the programmable block, based on the indication, a subset of a plurality of pipeline stages in the programmable block using a multiplexer. Embodiments include balancing latency throughout the SSN on the integrated circuit based on the selected subset of the plurality of pipeline stages in the programmable block.

20 Claims, 10 Drawing Sheets

(56)     References Cited

U.S. PATENT DOCUMENTS

| | | | |
|---|---|---|---|
| 2023/0408581 A1* | 12/2023 | Kandula | G01R 31/318555 |
| 2024/0062842 A1* | 2/2024 | Roethig | G06F 7/584 |
| 2025/0180645 A1* | 6/2025 | Abraham | G06F 13/4022 |

* cited by examiner

100

Streaming Scan Network 150

Components to be Tested 156

Programmable Block 154

Testing Component 152

900

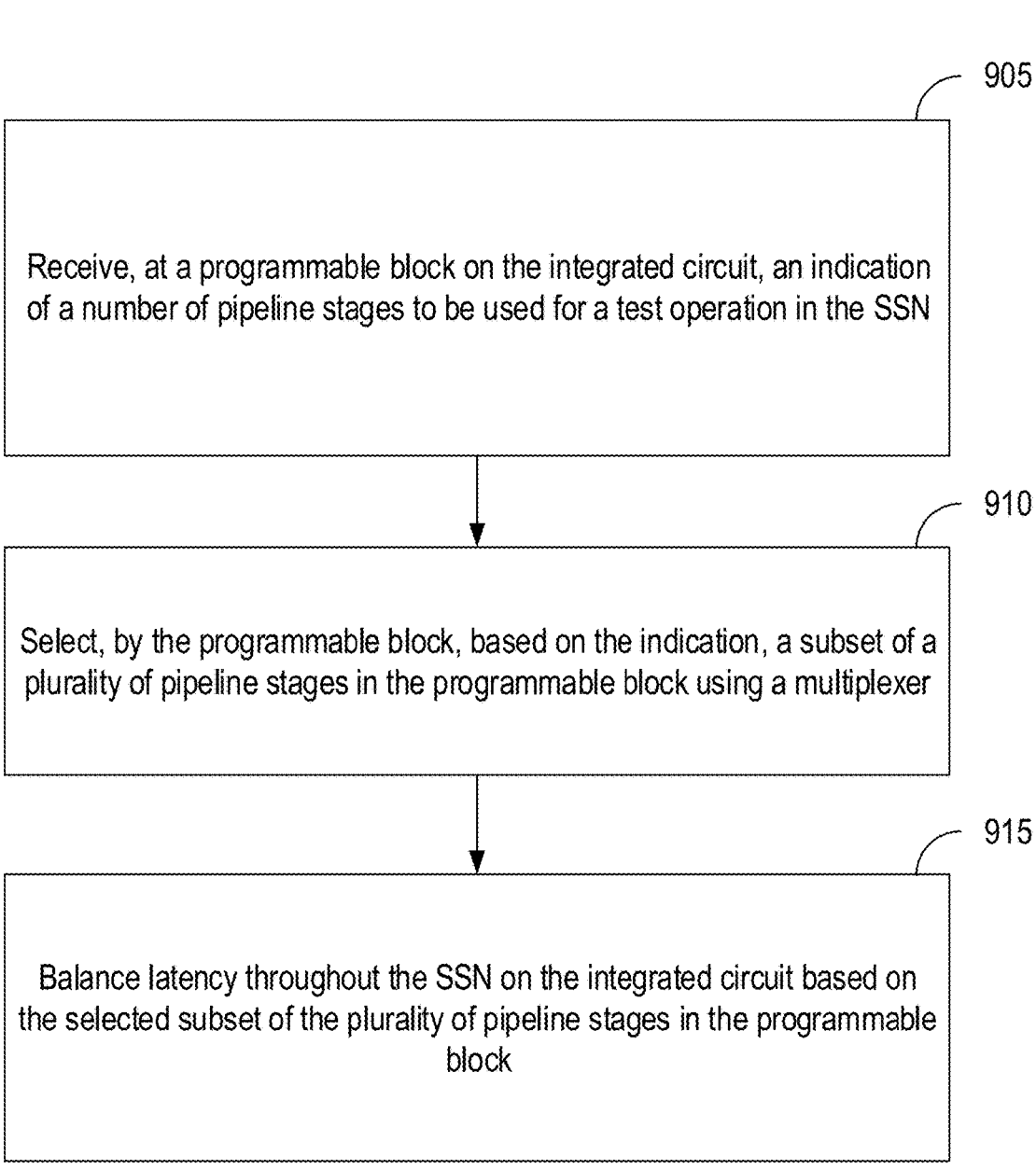

905

Receive, at a programmable block on the integrated circuit, an indication of a number of pipeline stages to be used for a test operation in the SSN

910

Select, by the programmable block, based on the indication, a subset of a plurality of pipeline stages in the programmable block using a multiplexer

915

Balance latency throughout the SSN on the integrated circuit based on the selected subset of the plurality of pipeline stages in the programmable block

*FIG. 9*

STREAMING SCAN NETWORK LATENCY BALANCING TO REDUCE COST OF TESTING IDENTICAL REPLICATED BLOCKS

INTRODUCTION

Aspects of the present disclosure relate to latency balancing in a streaming scan network (SSN).

A computing device may include multiple subsystems, cores, or other components. Such a computing device may be, for example, a portable computing device ("PCD"), such as a laptop or palmtop computer, a cellular telephone or smartphone, portable digital assistant, portable game console, etc. The multiple subsystems, cores or other components of a computing device may be included within different chips or in the same integrated circuit chip. A "system-on-a-chip" or "SoC" is an example of one such chip that integrates numerous components to provide system-level functionality. For example, an SoC may include one or more types of processors, such as central processing units ("CPU"s), graphics processing units ("GPU"s), digital signal processors ("DSP"s), and neural processing units ("NPU"s). An SoC may include other processing subsystems, such as a transceiver or "modem" subsystem that provides wireless connectivity, a memory subsystem, etc.

Testing a complex chip such as an SoC may involve the use of a streaming scan network (SSN). In some cases, an SoC may include two or more cores or other components and a streaming scan bus, which may also be referred to as a network-on-a-chip or "NoC," that interconnects the cores or other components in a packetized data network. Such a packetized data network may be referred to as an SSN, which generally provides a test data streaming network that is built into the design of an integrated circuit (e.g., an SoC) for delivery of test pattern data as needed throughout the design and return of test results to a testing component for analysis. Pipelines are used in an SSN to transmit test data to components and to transmit test results output from each component through the SSN and ultimately to the testing component. Thus, a sufficient amount of pipelines must be provided in order to deliver all applicable test data and test results throughout the SSN. Different amounts of data may be input to and output from each component (e.g., core), such as due to the larger amounts of test results that are accumulated with each successive component and that must be delivered through the remainder of the SSN for ultimate delivery to the testing component. Thus, different numbers of input pipelines and output pipelines may be associated with each component, even in the case where multiple components are identical to one another (e.g., in design, such as in the case of multiple identical replicated cores). Existing SSNs involve the use of different test patterns for each of a plurality of identical replicated components due to the differences in pipeline stage depth among such components, resulting in inefficiencies. For example, using different test patterns for each of multiple identical components (e.g., with each different test pattern accounting for the particular number of input pipelines and the particular number of output pipelines of each individual component) involves utilization of large amounts of computing resources.

BRIEF SUMMARY

Certain aspects provide a method, comprising: receiving, at a programmable block on the integrated circuit, an indication of a number of pipeline stages to be used for a test operation in the SSN; selecting, by the programmable block, based on the indication, a subset of a plurality of pipeline stages in the programmable block using a multiplexer; and balancing latency throughout the SSN on the integrated circuit based on the selected subset of the plurality of pipeline stages in the programmable block.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The appended figures depict certain features of one or more aspects of the present disclosure and are therefore not to be considered limiting of the scope of this disclosure.

FIG. 9 is a flow diagram depicting an example method of streaming scan network latency balancing according to various aspects of the present disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1:
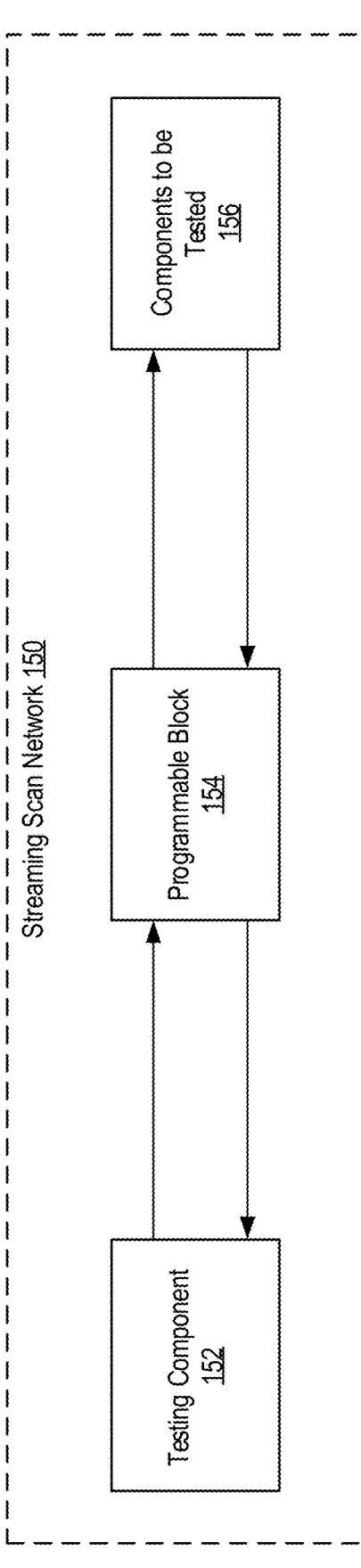
FIG. 1 illustrates an example of streaming scan network latency balancing according to various aspects of the present disclosure.

Aspects of the present disclosure provide apparatuses, methods, processing systems, and computer-readable mediums for streaming scan network latency balancing according to various aspects of the present disclosure.

As described in more detail below with respect to FIG. 2, the design of an integrated circuit such as a "system-on-a-chip" or "SoC" may include multiple identical components such as identical replicated cores. Existing streaming scan networks (SSNs) involve the use of different test patterns for each of multiple identical components due to the differences in pipeline stage depth across the components. Pipeline stage depth may refer to numbers of input pipelines and/or output pipelines associated with a given component. A pipeline may be implemented via a flip-flop (e.g., "flop"). A pipeline may be a sequential element comprising a clock, an input (e.g., referred to as the variable D), and an output (e.g., referred to as the variable Q). Components may refer to blocks, such as cores, within an integrated circuit.

Utilizing the same test pattern for each identical component would provide significant computing resource savings, but in order to do so the number of input pipelines and output pipelines for each identical component should match. However, adding additional pipelines to individual components so that all identical components have the same numbers of pipelines (e.g., matching the maximum number of input pipelines and/or output pipelines for any component tested in the SSN) would involve the addition of a considerable amount of pipelines, which would occupy a significant amount of space on the chip and result in inefficiencies. Alternatively, adding additional data path buses for delivery of test results directly back to the end of the SSN from each component would involve significant area overhead. To overcome these challenges, aspects described herein involve utilizing a programmable block to dynamically select a number of pipelines for use in an SSN.

According to certain embodiments, a programmable block includes one or more registers connected to a plurality of pipelines that can be dynamically selected using the one or more registers. The registers may, for example, be test data registers (TDRs). The programmable block may be located at or near the beginning of the SSN, such as prior in the SSN's data path to one or more components that are tested via the SSN. In some embodiments, the programmable block is located outside of one or more functional blocks of the chip in which the component(s) to be tested are located, thereby avoiding area overhead in such functional blocks. Generally, the programmable block is located in the data path of the SSN and not necessarily near the components to be tested.

As described in more detail below with respect to FIG. 3, the number of pipelines for a given test case may be determined based on which components are to be tested in the test case, and that number may be input to the one or more registers of the programmable block in order to dynamically select that number of pipelines for use in the SSN. The registers may be connected to the plurality of pipelines in the programmable block via a multiplexer (MUX) that is used to select a given number of pipelines based on a value input to the registers. The selected number of pipelines may be used to transmit data via one or more data buses of the SSN in such a manner that the same number of input pipelines and the same number of output pipelines is used for each component that is tested. Thus, techniques described herein enable an identical test pattern to be used for multiple identical components (e.g., identical replicated cores) that are tested in an SSN, thereby significantly reducing computing resource utilization. Furthermore, by utilizing a programmable block that is located separately from the components to be tested within the data path of the SSN to dynamically select a number of pipelines for use in each given test run, techniques described herein enable the use of an identical test pattern for such components while minimizing additional area overhead and, in some embodiments, avoiding additional area overhead altogether in particular functional blocks containing components to be tested. It is noted that identical components refer to two or more components that share a common design.

As described in more detail below with respect to FIGS. 3 and 4, one or more bypass paths may also be added to the SSN, such as in cases of symmetrical chip designs. For example, a bypass path comprising a data bus that leads directly to the end of the SSN may be added to one or more locations in the SSN, such as after a first half of a symmetrical pattern. Such a bypass path may allow the programmable block to include fewer pipelines, thereby further reducing the area overhead of the programmable block on the chip, such as due to the ability to test a subset of the components connected to the SSN while by passing other components, and the resultant reduction in number of pipelines needed.

Furthermore, as described in more detail below with respect to FIG. 6, flexible pipelines that may function as either input pipelines or output pipelines may be used in order to further reduce the area overhead of the programmable block. Additionally, as described in more detail below with respect to FIG. 7, a pipeline may be implemented via a latch array in memory without the introduction of a physical flop to further reduce area overhead. Further, as described in more detail below with respect to FIG. 8, the programmable block described herein can be implemented in any area of the chip and/or external to the chip in order to avoid area overhead in parts of the chip where area restrictions are highest.

Techniques described herein provide various technical improvements with respect to existing SSN implementations. For example, utilizing a programmable block to dynamically select a number of pipelines to use in an SSN based on which components are to be tested enables the same test pattern to be used for multiple identical components, such as identical replicated cores, with minimal area overhead, such as avoiding utilization of area within parts of the chip with the greatest area restrictions. Thus, aspects described herein improve computing resource utilization without significant impact to utilization of space on a chip, particularly in critical areas of the chip. Furthermore, certain embodiments of the present disclosure involve including one or more bypass paths in the SSN, thereby enabling fewer pipelines to be included in the programmable block and further reducing the area overhead of techniques described herein. Additional enhancements described herein involve utilizing flexible pipelines that can function as either input pipelines or output pipelines, thereby further reducing the number of pipelines needed in the programmable block and resulting in less area utilization. Further, certain embodiments involve implementing pipelines via latch areas in memory, thereby avoiding the area overhead of physical flops. In some embodiments, the programmable block may be located away from particular functional blocks of the chip and/or may be located external to the chip, thereby avoiding area impact to the particular functional blocks and/or the entire chip.

FIG. 1 is an illustration 100 depicting an example of streaming scan network latency balancing according to various aspects of the present disclosure.

In illustration 100, a streaming scan network (SSN) 150 involves a testing component 152 utilizing a programmable block 154 to send test data to and receive test results from one or more components to be tested 156 in order to balance latency within the SSN without adding additional pipelines outside of programmable block 154. For example, testing component 152, programmable block 154, and/or components to be tested 156 may be located on an integrated circuit such as a system-on-a-chip (SoC) (e.g., computing device 200 of FIG. 2, computing device 300 of FIG. 3, and/or the like), or may be located on a component associated with such a device.

Testing component 152 generally sends test data (e.g., test patterns), receives results of tests, and/or analyzes results of tests within SSN 150.

Programmable block 154 may include one or more registers connected to a plurality of pipelines that can be dynamically selected using the one or more registers. The registers may, for example, be test data registers (TDRs). Programmable block 154 may be located at or near the beginning SSN 150, such as prior in the SSN's data path to the components to be tested 156. In some embodiments, programmable block 154 is located outside of one or more functional blocks of the chip in which the components to be tested 156 are located, thereby avoiding area overhead in such functional blocks. Generally, programmable block 154 is located in the data path of SSN 150 and not necessarily near the components to be tested 156. Components to be tested 156 may include, for example, processor cores.

Details of problems solved by programmable block 154 are described in more detail below with respect to FIG. 2, and example details of programmable block 154 are described in more detail below with respect to FIGS. 3-6.

Example Computing Components for Streaming Scan Network Latency Balancing

Figure 2:
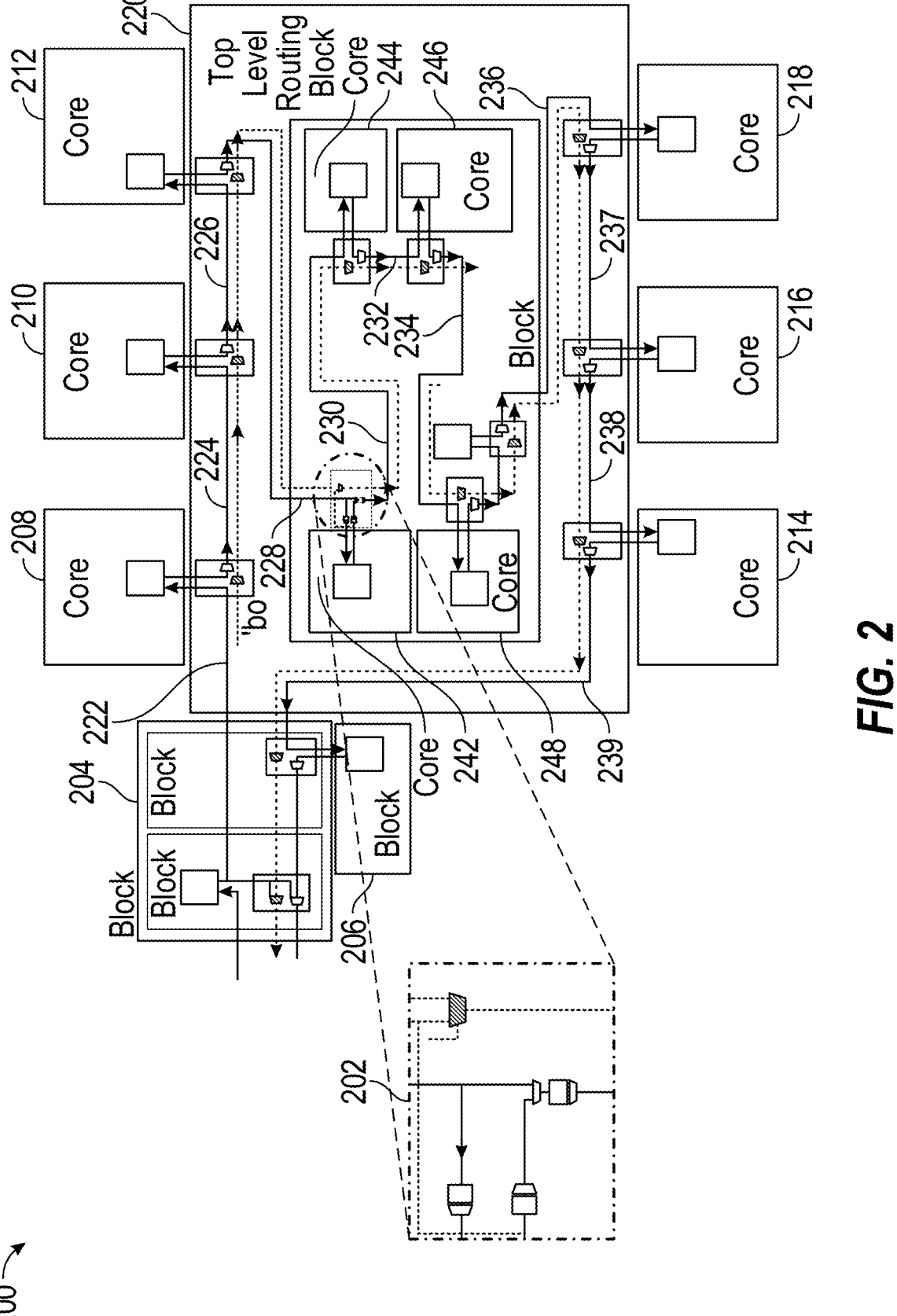
FIG. 2 illustrates an example of computing components related to streaming scan network latency balancing according to various aspects of the present disclosure.

FIG. 2 illustrates an example of computing components related to streaming scan network latency balancing according to various aspects of the present disclosure. Computing device 200, which may be an integrated circuit such as a system-on-a-chip (SoC), includes cores 208, 210, 212, 214, 216, and 218 (which may be identical cores of a first type) and cores 242, 244, 246, and 248 (which may be identical cores of a second type), each of which may represent components that can be tested via a streaming scan network (SSN). For example, cores 208, 210, 212, 214, 216, and 218 may be identical replicated cores (e.g., cores of a first type that are identical to one another) and/or cores 242, 244, 246, and 248 may be identical replicated cores (e.g., cores of a second type that are identical to one another).

Computing device 200 includes various functional blocks, such as data top level routing block 220, block 204, block 206, block 202, and the like. Certain functional blocks, such as top level routing block 220, may be particularly sensitive to area overhead, such as due to being densely populated with physical elements.

An SSN may include one or more data buses, such as data buses 222, 224, 226, 228, 230, 232, 234, 236, 237, 238, and 239, that transport test data such as test inputs, expected test results, and actual test results throughout the SSN. In existing SSN implementations, different test patterns are used even for identical components due to the differences in pipeline stage depth between components to be tested. For example, if processor cores 208, 210, 212, 214, 216, and 218 and processor cores 242, 244, 246, and 248 are tested in the SSN, each of these components may have a different number of input pipelines and/or output pipelines. Core 208, for instance, may have one input pipeline (e.g., for carrying the input test data) and two output pipelines (e.g., for carrying the input test data and the result of performing the test at core 208). Core 210 may have two input pipelines (e.g., for carrying the input test data and the result of performing the test at core 208) and three output pipelines (e.g., for carrying the input test data and the results of performing the test at core 208 and at core 210). Core 212 may have three input pipelines (e.g., for carrying the input test data and the results of performing the test at cores 208 and 210) and four output pipelines (e.g., for carrying the input test data and the results of performing the test at cores 208, 210, and 212). Core 242 may have four input pipelines (e.g., for carrying the input test data and the results of performing the test at cores 208, 210, and 212) and five output pipelines (e.g., for carrying the input test data and the results of performing the test at cores 208, 210, and 212, and core 242), as illustrated in block 202.

This pattern may continue, with core 214 having ten input pipelines (e.g., for carrying the input test data and the results of performing the test at cores 208, 210, and 212, cores 242, 244, 246, and 248, and cores 218 and 216) and ten output pipelines (e.g., for carrying the results of performing the test at cores 208, 210, and 212, cores 242, 244, 246, and 248, and cores 218, 216, and 214). These variations in numbers of input pipelines and output pipelines are accounted for in existing techniques through differing test patterns for each component. The numbers of input pipelines and output pipelines described herein are included as examples, and other numbers are possible.

Adding input pipelines and/or output pipelines to each component as appropriate to balance the numbers of pipelines among components would involve significant area overhead. Alternatively, adding additional data buses to return the results of performing the test at each component, such as after each component in the data path, would also add considerable area overhead. Accordingly, aspects of the present disclosure involve the use of a programmable block for dynamically selecting a number of pipelines for use in an SSN, as described in more detail below with respect to FIG. 3.

Figure 3:
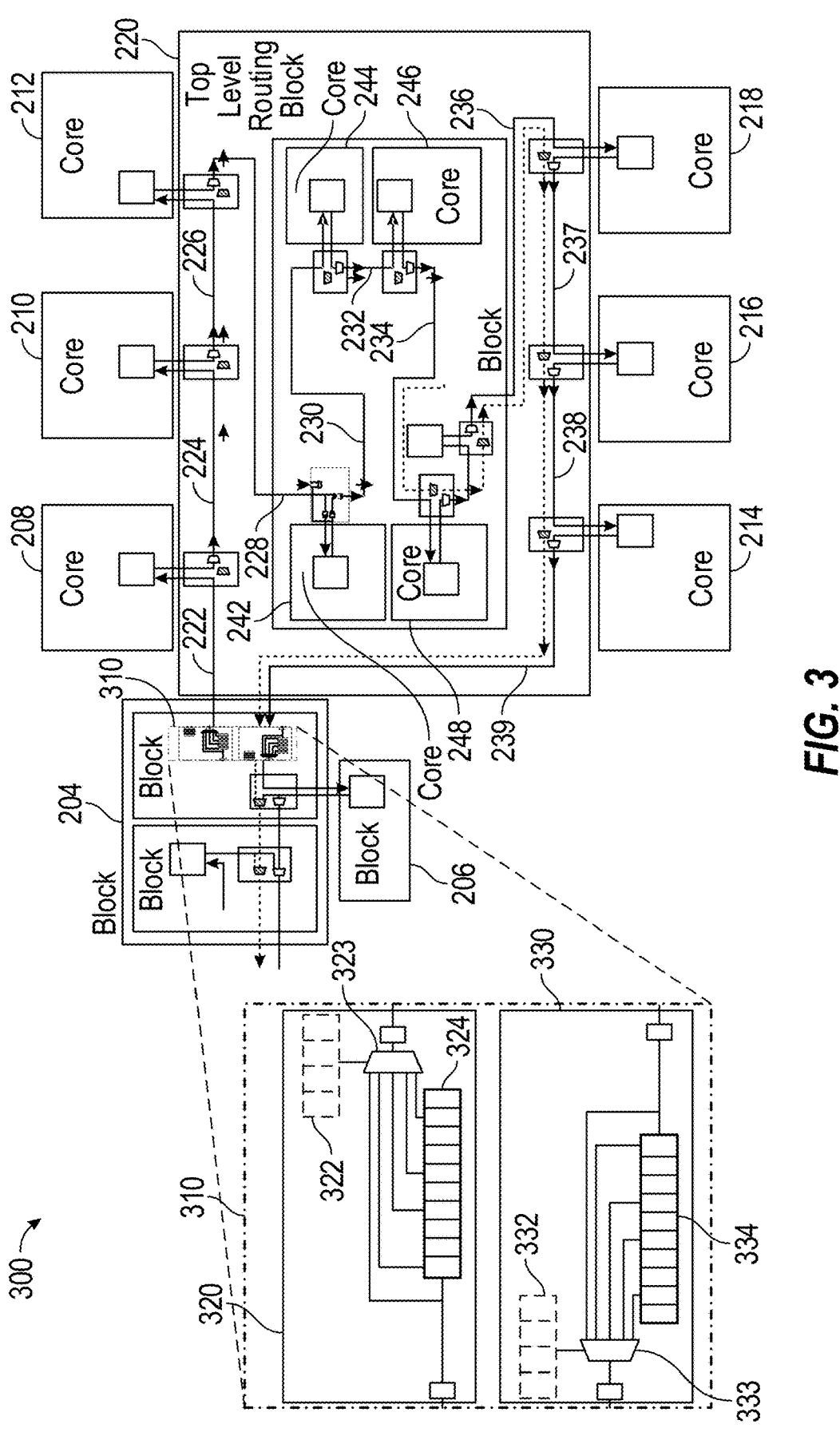
FIG. 3 illustrates another example of computing components related to streaming scan network latency balancing according to various aspects of the present disclosure.

FIG. 3 illustrates another example of computing components related to streaming scan network latency balancing according to various aspects of the present disclosure. Computing device 300 may be similar to computing device 200 of FIG. 2.

In computing device 300, a programmable block 310 has been added for use in dynamically selecting numbers of pipelines for use in the SSN. Programmable block 310 includes an input block 320 and an output block 330. Input block 330 includes registers 322, which may be test data registers (TDRs), connected via a multiplexer (MUX) 323 to a plurality of pipelines 324. Similarly, output block 330 includes registers 332, which may be test data registers (TDRs), connected via a multiplexer (MUX) 333 to a plurality of pipelines 334.

Selecting a particular number of pipelines 324 may be accomplished by populating registers 322 with the test initialization sequence (e.g., in binary). For example, selecting zero pipelines 324 may be accomplished by populating registers 322 with 0000, while selecting ten pipelines 324 may be accomplished by populating registers 322 with 1010. In such a case, the indicated number of pipelines 324 may be selected by operation of MUX 323. Registers 332 may be used in a similar manner in output block 330 to select a particular number of pipelines 334.

Advantageously, by locating programmable block 310 in the data path of the SSN but outside of the functional block(s) (e.g., top level routing block 220) in which components to be tested are located or with which components to be tested are associated, area overhead in such portions of the device may be avoided.

When a test is to be run in the SSN, a number of input pipelines and a number of output pipelines for the test may be determined based on a maximum number of input pipelines and a maximum number of output pipelines that will be needed (e.g., based on the largest number of input pipelines used by any component, such as core 214, in the SSN and the largest number of output pipelines used by any component, such as core 214, in the SSN). The determined number of input pipelines may be used to populate registers 322, causing that number of pipelines 324 to be selected through operation of MUX 323, and then used in the SSN for delivery of test data to cores 208, 210, 212, 214, 216, and 218 and cores 242, 244, 246, and 248. Similarly, the determined number of output pipelines may be used to populate registers 332, causing that number of pipelines 334 to be selected through operation of MUX 333, and then used in the SSN for delivery of test data from cores 208, 210, 212, 214, 216, and 218 and cores 242, 244, 246, and 248. For example, the determined number of output pipelines may be transmitted through the SSN via a separate path (e.g., other than the main data path) and used at output block 330 for populating registers 332.

Programmable block 310 balances latency throughout the SSN (e.g., by equalizing the numbers of input pipelines and output pipelines across tested components) so that the same test pattern (e.g., corresponding to the equalized numbers of input pipelines and output pipelines) can be used for each component (e.g., for all identical components). Each pipeline introduces latency on the input side or output side of a component Thus, programmable block 310 allows for a unified test pattern to be used for identical components, thereby improving computing resource efficiency while minimizing area overhead.

Figure 4:
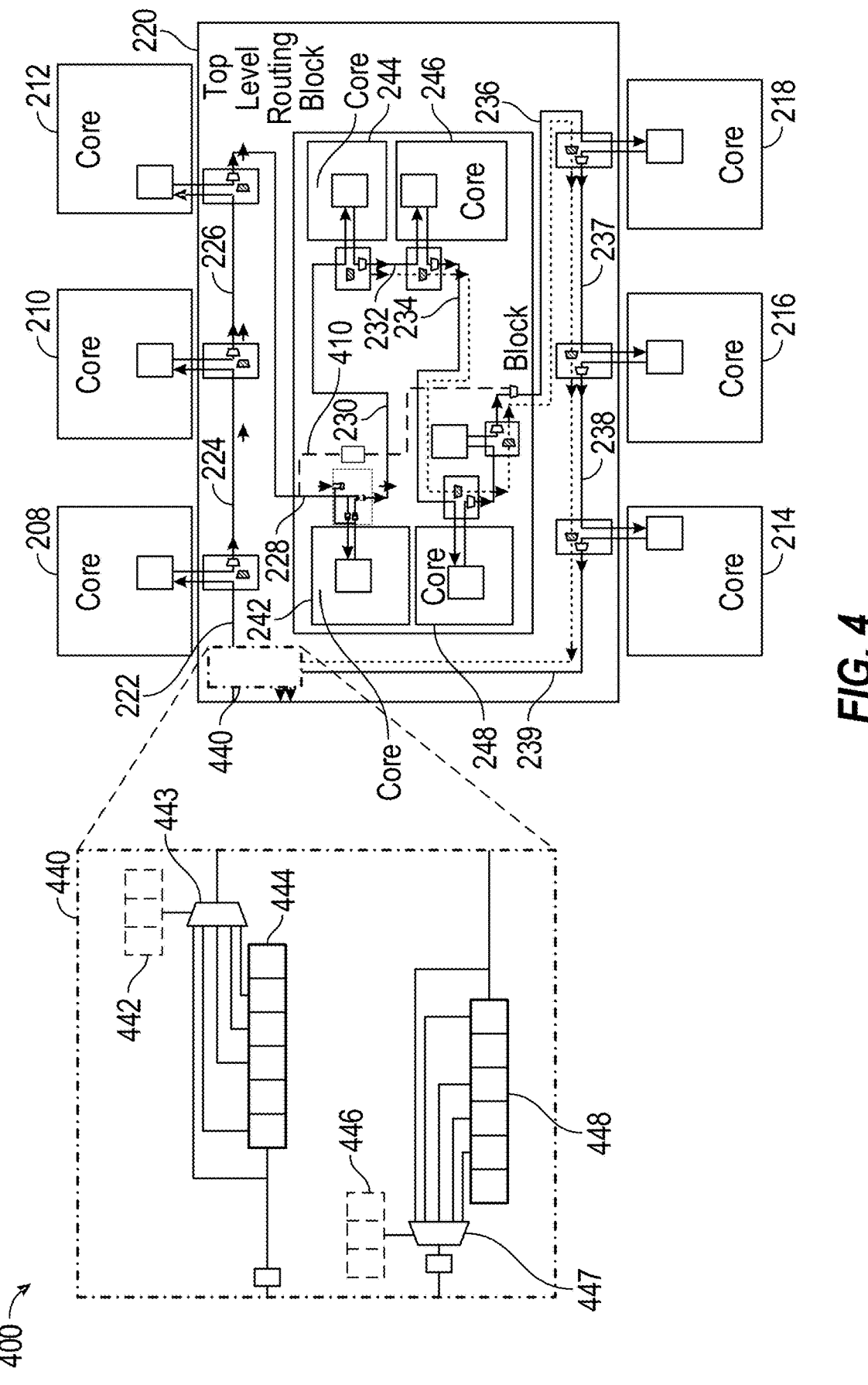
FIG. 4 illustrates another example of computing components related to streaming scan network latency balancing according to various aspects of the present disclosure.

FIG. 4 illustrates another example of computing components related to streaming scan network latency balancing according to various aspects of the present disclosure. Computing device 400 may be similar to computing device 300 of FIG. 3.

In computing device 400, a bypass path 410 has been added to the SSN. Bypass path 410 may represent a data bus that allows cores 242, 244, 246, and 248 to be bypassed in the SSN's data path, such as running from a point in the SSN's data path after core 212 to a point in the SSN's data path before core 218.

The inclusion of bypass path 410 enables a smaller number of registers 442 and 446 and pipelines 444 and 248 to be included in programmable block 440 than are included in programmable block 310 of FIG. 3. For example, when bypass path 410 is used, the maximum number of input pipelines that will be used by a component in the SSN is six, because if bypass path 410 is used then core 214 may have six input pipelines (e.g., carrying the input test data and the results of performing the test at cores 208, 210, 212, 218, and 216). Similarly, when bypass path 410 is used, the maximum number of output pipelines that will be used by a component in the SSN is six, because if bypass path 410 is used then core 214 may have six output pipelines (e.g., carrying the results of performing the test at cores 208, 210, 212, 218, 216, and 214). Thus, programmable block 440 in computing device 400 includes six input pipelines 444 and six output pipelines 448. Similarly, only three input registers 442 and three output registers 446 are needed, as the largest binary number that these registers need to support is 210 (having only three digits), which is decimal six in binary.

Programmable block 440 may function similarly to programmable block 310 of FIG. 3. For example, populating registers 442 with a number may cause that number of pipelines 444 to be selected, through operation of MUX 443. Similarly, populating registers 446 with a number may cause that number of pipelines 448 to be selected, through operation of MUX 447.

It is noted that configuring computing device 400 with bypass path 410 and a corresponding programmable block 440 (e.g., having six input pipelines 444 and six output pipelines 448) may exclude the possibility of testing cores 242, 244, 246, and 248 using the SSN.

Reducing the numbers of pipelines and/or registers in programmable block 440 reduces the area overhead of programmable block 440, thereby providing a further technical enhancement. Furthermore, enabling bypass of certain components may increase the efficiency of executing tests in the SSN.

Figure 5:
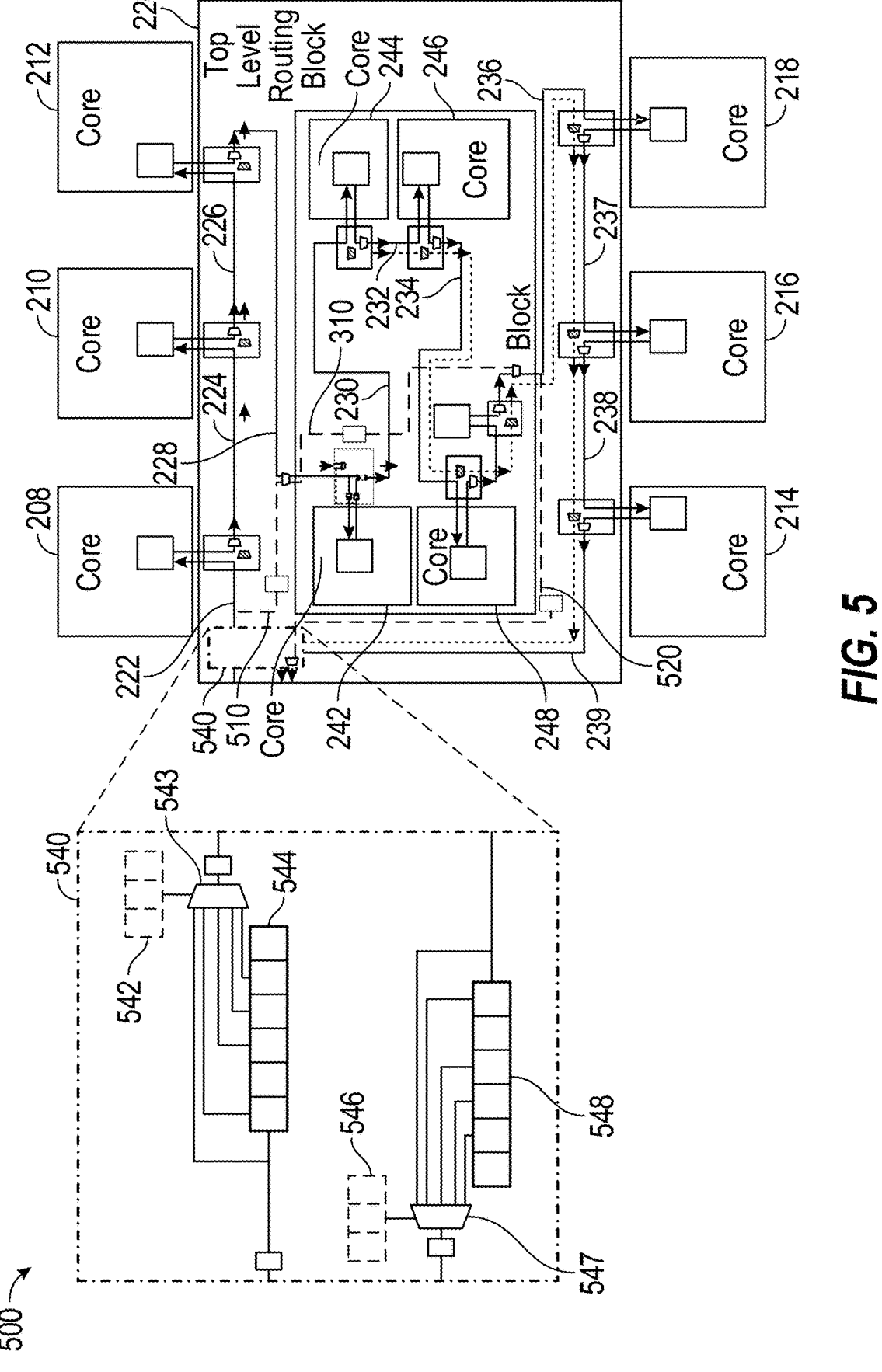
FIG. 5 illustrates another example of computing components related to streaming scan network latency balancing according to various aspects of the present disclosure.

FIG. 5 illustrates another example of computing components related to streaming scan network latency balancing according to various aspects of the present disclosure. Computing device 500 may be similar to computing device 400 of FIG. 4.

In computing device 400, bypass paths 510 and 520 have been added to the SSN, in addition to bypass path 410. Bypass paths 510 and 520 may represent data buses that allows cores 208, 210, 212, 218, 216, and/or 218 to be bypassed in the SSN's data path. For example, bypass path 510 may run from a point in the SSN's data path before core 208 to a point in the SSN's data path after core 218 and bypass path 520 may run from a point in the SSN's data path before core 218 to a point in the SSN's data path after core 214.

Utilizing bypass path 510 may cause cores 208, 210, and 212 to be bypassed. Utilizing bypass path 410 may cause cores 242, 244, 246, and 248 to be bypassed. Utilizing bypass path 520 may cause cores 218, 216, and 214 to be bypassed.

The inclusion of bypass paths 510 and 520 enables an even smaller number of pipelines 544 and 548 to be included in programmable block 540 than are included in programmable block 440 of FIG. 4. For example, when bypass paths 510 and 520 are used, the maximum number of input pipelines that will be used by a component in the SSN is four, because if bypass paths 510 and 520 are used then core 248 may have four input pipelines (e.g., carrying the input test data and the results of performing the test at cores 242, 244, and 246). Similarly, when bypass paths 510 and 520 are used, the maximum number of output pipelines that will be used by a component in the SSN is four, because if bypass paths 510 and 520 are used then core 248 may have four output pipelines (e.g., carrying the results of performing the test at cores 242, 244, 246, and 248). Thus, programmable block 540 in computing device 500 includes four input pipelines 544 and four output pipelines 548. Similarly, only three input registers 542 and three output registers 546 are needed, as the largest binary number that these registers need to support is 200 (having only three digits), which is decimal four in binary.

Programmable block 540 may function similarly to programmable block 310 of FIG. 3 and programmable block 440 of FIG. 4. For example, populating registers 542 with a number may cause that number of pipelines 544 to be selected, through operation of MUX 543. Similarly, populating registers 546 with a number may cause that number of pipelines 548 to be selected, through operation of MUX 547.

It is noted that configuring computing device 400 with bypass paths 510, 410, and 520 and a corresponding programmable block 540 (e.g., having four input pipelines 544 and four output pipelines 548) may mean that in any given test case two or more of bypass paths 510, 320, and 520 must be used.

Reducing the numbers of pipelines and/or registers in programmable block 540 reduces the area overhead of programmable block 540, thereby providing a further technical enhancement. Furthermore, enabling bypass of certain components may increase the efficiency of executing tests in the SSN and/or may allow for more fine-grained selection of components to test in a given test case.

Additional Enhancements Related to Streaming Scan Network Latency Balancing

Figure 6:
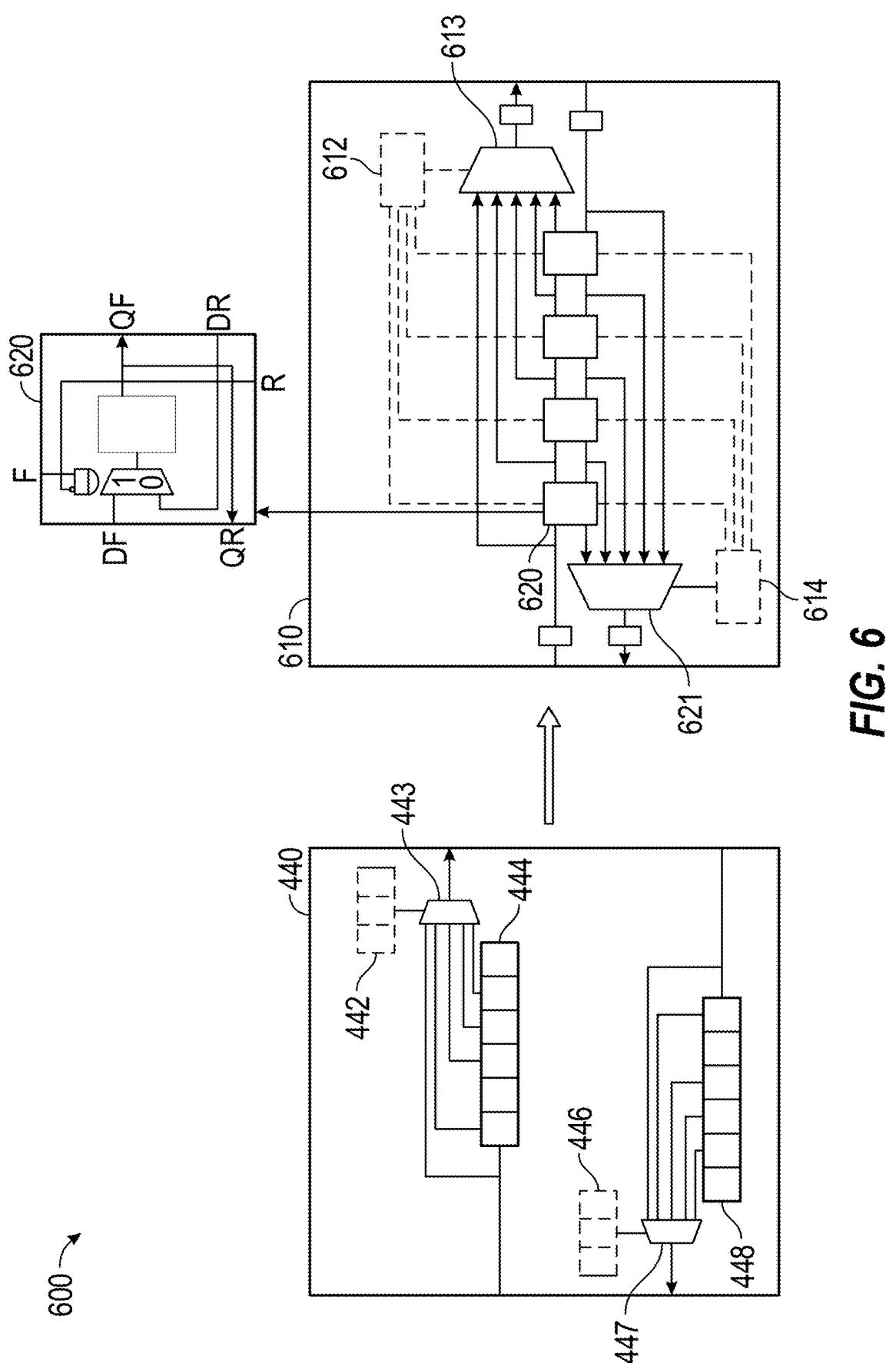
FIG. 6 illustrates an example enhancement related to streaming scan network latency balancing according to various aspects of the present disclosure.

FIG. 6 illustrates an example enhancement 600 related to streaming scan network latency balancing according to various aspects of the present disclosure.

In enhancement 600, programmable block 540 of FIG. 5 is replaced with an alternative programmable block 610, in which pipelines such as pipeline 620 are flexible pipelines that may function as either input or output pipelines. Programmable block 610 may function similarly to programmable block 310 of FIG. 3, programmable block 440 of FIG. 4, and programmable block 540 of FIG. 5. For example populating registers 612 with a number may cause that number of input pipelines to be selected through operation of MUX 613 and populating registers 614 with a number may cause that number of output pipelines to be selected through operation of MUX 621. However, because the pipelines are flexible, only four total pipelines are needed, rather than four input pipelines and four output pipelines as in programmable block 540 of FIG. 5.

For example, pipeline 620 may function as either an input pipeline or an output pipeline through control logic that includes a forward path input DF, a forward path output QF, a return path input DR and a return path output QR. Whether pipeline 620 functions as an input pipeline or an output pipeline (e.g., whether DF and QF are used or DR and QR are used) may be indicated via a binary input (e.g., 1 or 0) to pipeline 620, such as from registers 612 and/or 614. Other pipelines in programmable block 610 may function similarly to pipeline 620.

Utilizing flexible pipelines allows for a further reduction of the area footprint of programmable block 610.

Figure 7:
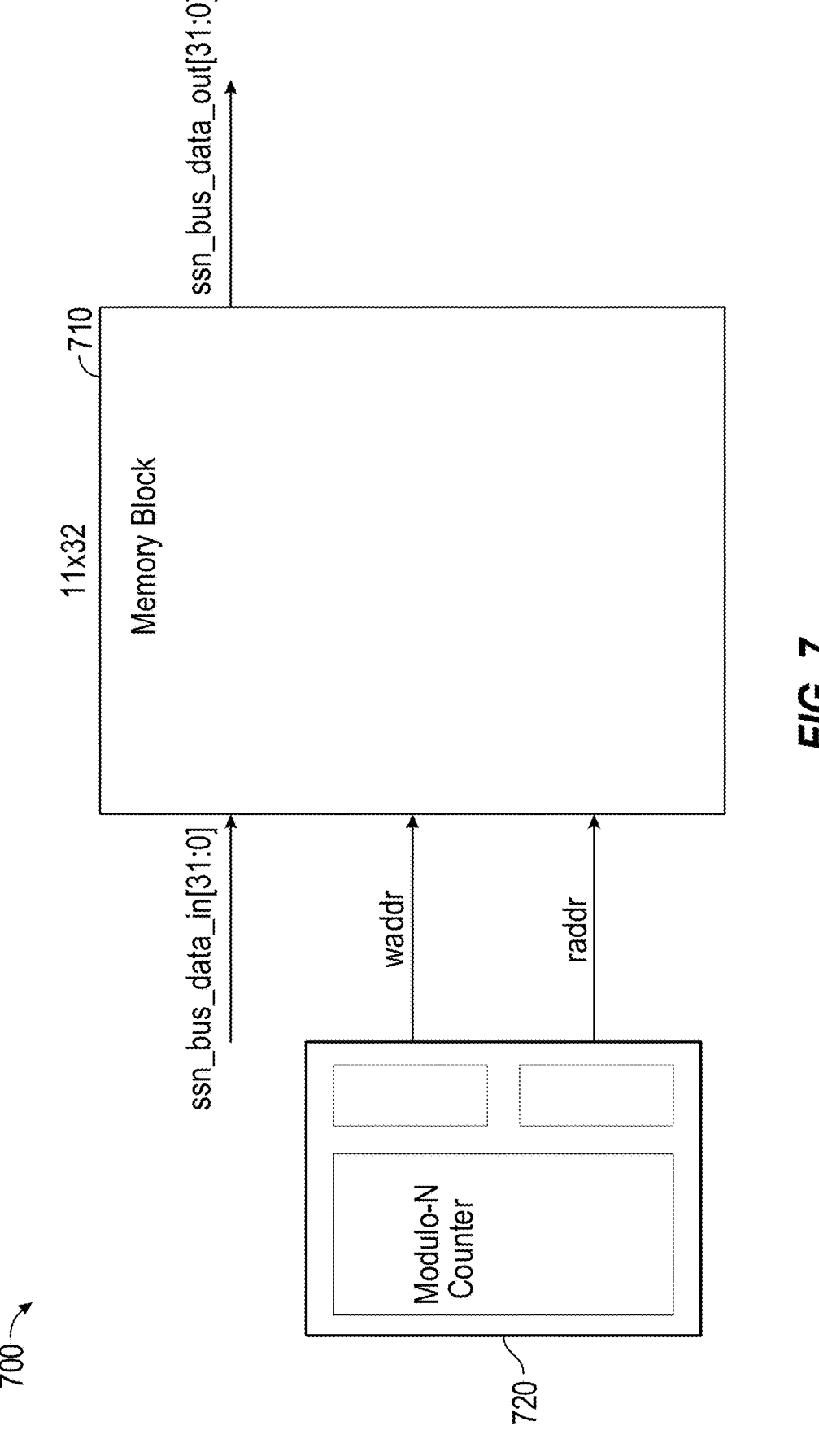
FIG. 7 illustrates another example enhancement related to streaming scan network latency balancing according to various aspects of the present disclosure.

FIG. 7 illustrates another example enhancement 700 related to streaming scan network latency balancing according to various aspects of the present disclosure.

In enhancement 700, one or more pipelines are implemented via a latch array in memory, rather than using one or more physical flops. For example, one or more pipelines described above with respect to FIGS. 2-6 may be implemented as a memory block.

For example, the memory block may implement a variable depth SSN pipeline. In block 720, a modulo-N counter may be used to control the depth of the pipeline stages to be implemented. In this case, N may be set using one or more registers (e.g., test data registers) controlled by a test initiation pattern. A write address (waddr) may be set to 'd0 and a read address (raddr) may be set to 'd1, and waddr and raddr may be input to memory block 710. Furthermore, SSN input bus data may be input to memory block 710, and SSN output bus data may be output from memory block 710. Memory block 710 may, for example, comprise an 11×32 latch array.

Implementing one or more pipelines via a latch array in memory may further reduce the area overhead of programmable blocks described herein.

It is noted that implementing one or more pipelines via one or more latch arrays in memory may provide particular benefits in embodiments where large numbers of replicated cores are present. For example, while FIGS. 2-5 depict a relatively small number of cores (e.g., ten cores) in an SSN for ease of explanation, other embodiments may involve significantly larger numbers of cores, such as hundreds of replicated cores (e.g., organized as a two-dimensional or circular array). In such embodiments, implementing pipelines via memory may provide significant reduction in the area overhead of programmable blocks described herein.

Figure 8:
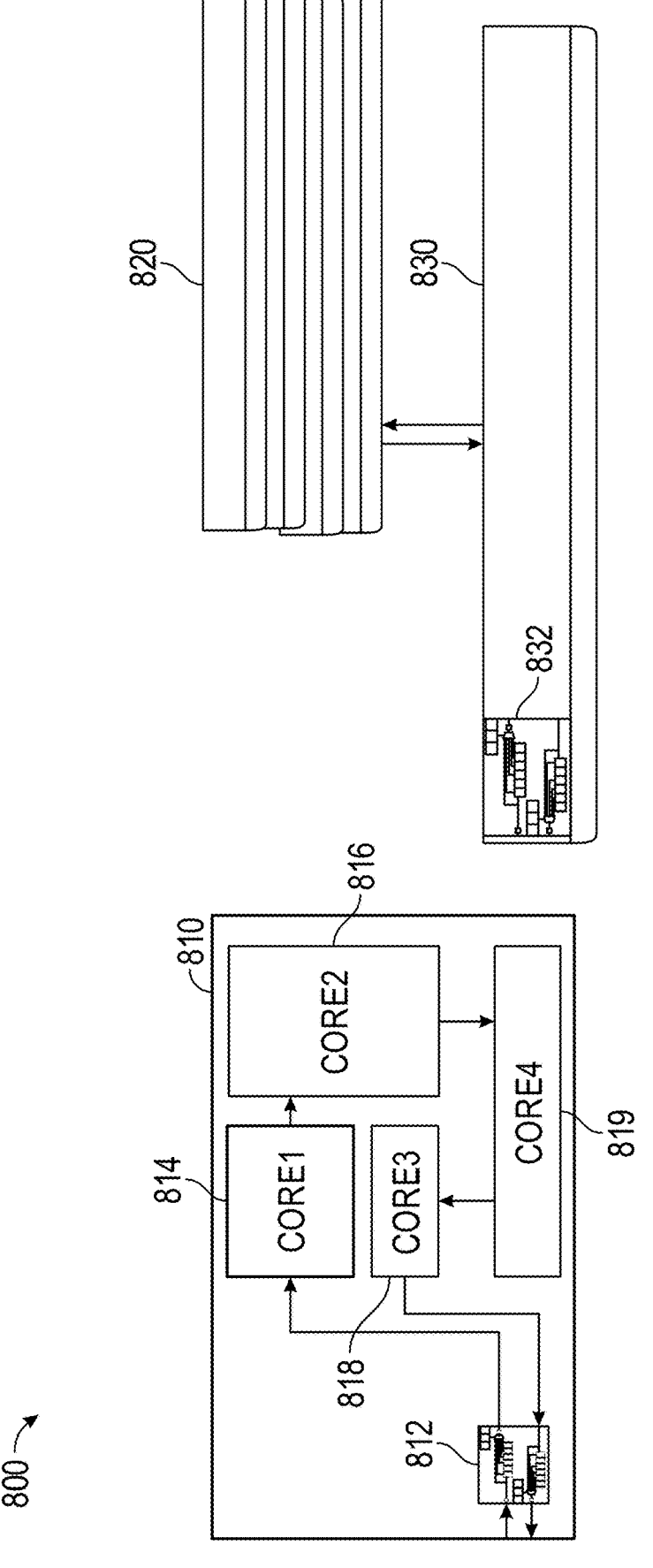
FIG. 8 illustrates another example enhancement related to streaming scan network latency balancing according to various aspects of the present disclosure.

FIG. 8 illustrates another example enhancement 800 related to streaming scan network latency balancing according to various aspects of the present disclosure.

In enhancement 800, programmable block 812 (e.g., representative of programmable block 310 of FIG. 3, programmable block 440 of FIG. 4, programmable block 540 of FIG. 5, and/or programmable block 610 of FIG. 6) may be located in a computing device 810 separately from one or more components (e.g., cores 814, 816, 818, and 819) tested in an SSN. For example, computing device 810 may be an integrated circuit such as an SoC, similar to computing device 200 of FIG. 2, computing device 300 of FIG. 3, computing device 400 of FIG. 4, and/or computing device 500 of FIG. 5. Programmable block 812 may be located outside of one or more functional blocks in which certain components to be tested are located and/or with which certain components to be tested are associated.

Furthermore, a programmable block 832 (e.g., representative of programmable block 310 of FIG. 3, programmable block 440 of FIG. 4, programmable block 540 of FIG. 5, and/or programmable block 610 of FIG. 6) may be located outside of the computing device 820 (e.g., integrated circuit such as an SoC) tested by the SSN, such as on a separate computing device 830 (e.g., a separate chip). For example, computing devices 820 and 830 may be chips (e.g., chiplets) stacked on top of one another. Computing device 830 may be a base chip, and programmable block 832 may be located on computing device 830 and used as part of an SSN to test components on computing device 820.

Thus, a programmable block described herein may be located away from critical portions of a computing device in which components to be tested via an SSN are located, such as when such portions are particularly sensitive to area overhead.

Example Method for Streaming Scan Network Latency Balancing

FIG. 9 is a flow diagram depicting an example method 900 of streaming scan network latency balancing according to various aspects of the present disclosure. For example, method 900 may be performed by one or more components of computing device 300 of FIG. 3, computing device 400 of FIG. 4, computing device 500 of FIG. 5, by one or more components described with respect to FIG. 6, 7, or 8, and/or by processing system 1000 of FIG. 10, described below.

Method 900 begins at block 905, with receiving, at a programmable block on the integrated circuit, an indication of a number of pipeline stages to be used for a test operation in the SSN.

Method 900 continues at block 910, with selecting, by the programmable block, based on the indication, a subset of a plurality of pipeline stages in the programmable block using a multiplexer.

Method 900 continues at block 915, with balancing latency throughout the SSN on the integrated circuit based on the selected subset of the plurality of pipeline stages in the programmable block.

In some embodiments, the selecting is based on populating one or more registers in the programmable block with the number of pipeline stages to be used for the test operation in the SSN.

In certain embodiments, the programmable block includes the plurality of pipeline stages for inputs to the SSN and an additional plurality of pipeline stages for outputs from the SSN.

In some embodiments, the programmable block is configured to use the plurality of pipeline stages as either input pipeline stages or output pipeline stages.

In certain embodiments, the number of pipeline stages corresponds to a number of inputs to a given processor core in the integrated circuit that has a largest number of inputs of a plurality of processor cores tested in the SSN.

In some embodiments, the programmable block is located outside of a section of the integrated circuit that is tested by the SSN.

In certain embodiments, the SSN comprises a bypass path that enables test data to be transmitted through the SSN while bypassing one or more processor cores connected to a data bus of the SSN.

In some embodiments, the selecting, by the programmable block, based on the indication, the subset of the plurality of pipeline stages in the programmable block using the multiplexer enables a same test pattern to be applied to each of a plurality of identical replicated blocks tested by the SSN.

In certain embodiments, the plurality of pipeline stages are implemented as a latch array.

Method 900 allows for a unified test pattern to be used for identical components such as identical replicated cores that are test in an SSN, thereby improving computing resource efficiency, while minimizing area overhead.

Example Processing System for Streaming Scan Network Latency Balancing

Figure 10:
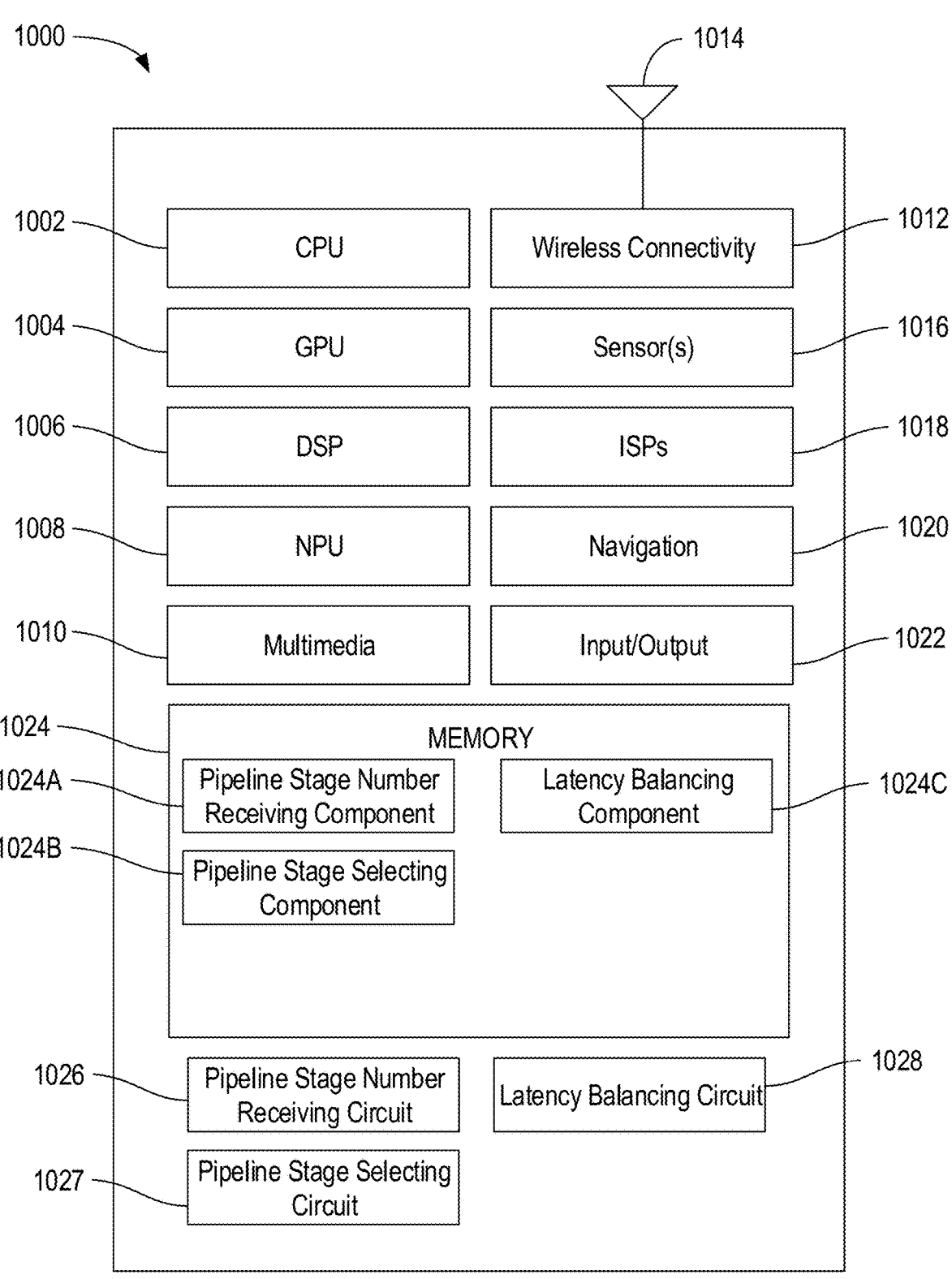
FIG. 10 depicts an example processing system configured to perform various aspects of the present disclosure.

In some aspects, the workflows, techniques, and methods described with reference to FIGS. 1-9 may be implemented on one or more devices or systems. FIG. 10 depicts an example processing system 1000 configured to perform various aspects of the present disclosure, including, for example, the techniques and methods described with respect to FIGS. 1-9. In some aspects, the processing system 1000 may correspond to computing device 300 of FIG. 3, computing device 400 of FIG. 4, and/or computing device 500 of FIG. 5. Although depicted as a single system for conceptual clarity, in some aspects, as discussed above, the operations described below with respect to the processing system 1000 may be distributed across any number of devices or systems.

The processing system 1000 includes a central processing unit (CPU) 1002, which in some examples may be a multi-core CPU (e.g., corresponding to processor(s) 220 of FIG. 2). Instructions executed at the CPU 1002 may be loaded, for example, from a program memory associated with the CPU 1002 or may be loaded from a memory partition (e.g., a partition of memory 1024).

The processing system 1000 also includes additional processing components tailored to specific functions, such as a graphics processing unit (GPU) 1004, a digital signal processor (DSP) 1006, a neural processing unit (NPU) 1008, a multimedia component 1010 (e.g., a multimedia processing unit), and a wireless connectivity component 1012.

An NPU, such as NPU 1008, is generally a specialized circuit configured for implementing the control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing unit (TPU), neural network processor (NNP), intelligence processing unit (IPU), vision processing unit (VPU), or graph processing unit.

NPUs, such as the NPU 1008, are configured to accelerate the performance of common machine learning tasks, such as image classification, machine translation, object detection, and various other predictive models. In some examples, a plurality of NPUs may be instantiated on a single chip, such as a SoC, while in other examples the NPUs may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process this piece of data through an already trained model to generate a model output (e.g., an inference).

In some implementations, the NPU 1008 is a part of one or more of the CPU 1002, the GPU 1004, and/or the DSP 1006.

In some examples, the wireless connectivity component 1012 may include subcomponents, for example, for third generation (3G) connectivity, fourth generation (4G) connectivity (e.g., 4G Long-Term Evolution (LTE)), fifth generation connectivity (e.g., 5G or New Radio (NR)), Wi-Fi connectivity, Bluetooth connectivity, and/or other wireless data transmission standards. The wireless connectivity component 1012 is further coupled to one or more antennas 1014.

The processing system 1000 may also include one or more sensor processing units 1016 associated with any manner of sensor, one or more image signal processors (ISPs) 1018 associated with any manner of image sensor, and/or a navigation processor 1020, which may include satellite-based positioning system components (e.g., GPS or GLONASS), as well as inertial positioning system components.

The processing system 1000 may also include one or more input and/or output devices 1022, such as screens, touch-sensitive surfaces (including touch-sensitive displays), physical buttons, speakers, microphones, and the like.

In some examples, one or more of the processors of the processing system 1000 may be based on an ARM or RISC-V instruction set.

The processing system 1000 also includes the memory 1024, which is representative of one or more static and/or dynamic memories, such as a dynamic random access memory, a flash-based static memory, and the like. In this example, the memory 1024 includes computer-executable components, which may be executed by one or more of the aforementioned processors of the processing system 1000.

In particular, in this example, the memory 1024 includes a pipeline stage number receiving component 1024A, a pipeline stage selecting component 1024B, and a latency balancing component 1024C. Though depicted as discrete components for conceptual clarity in FIG. 10 the illustrated components (and others not depicted) may be collectively or individually implemented in various aspects.

The processing system 1000 further comprises a pipeline stage receiving circuit 1026, a pipeline stage selecting circuit 1027, and a latency balancing circuit 1028. The depicted circuits, and others not depicted, may be configured to perform various aspects of the techniques described herein.

For example, the pipeline stage number receiving component 1024A and/or the pipeline stage number receiving circuit 1026 may be used to receive an indication of a number of pipeline stages to be used for a test operation in an SSN, as discussed above with respect to FIGS. 1-9.

The pipeline stage selecting component 1024B and/or the pipeline stage selecting circuit 1027 may be used to select, based on such an indication, a subset of a plurality of pipeline stages in the programmable block using a multiplexer, as described above with respect to FIGS. 1-9.

The latency balancing component 1024C and/or the latency balancing circuit 1028 may be used to balance latency throughout the SSN in the integrated circuit based on the selected subset of the plurality of pipeline stages in the programmable block, as described above with respect to FIGS. 1-9.

Though depicted as separate components and circuits for clarity in FIG. 10, the pipeline stage number receiving circuit 1026, the pipeline stage selecting circuit 1027, and the latency balancing circuit 1028 may collectively or individually be implemented in other processing devices of the processing system 1000, such as within the CPU 1002, the GPU 1004, the DSP 1006, the NPU 1008, and the like. For example, the pipeline stage number receiving circuit 1026, the pipeline stage selecting circuit 1027, and the latency balancing circuit 1028 may be implemented via one or more instructions in an instruction set of the CPU 1002, the GPU 1004, the DSP 1006, the NPU 1008, or the like.

Generally, the processing system 1000 and/or components thereof may be configured to perform the methods described herein.

Notably, in other aspects, elements of the processing system 1000 may be omitted, such as where the processing system 1000 is a server computer or the like. For example, the multimedia component 1010, the wireless connectivity component 1012, the sensor processing units 1016, the ISPs 1018, and/or the navigation processor 1020 may be omitted in other aspects. Further, aspects of the processing system 1000 may be distributed between multiple devices.

Example Clauses

Implementation examples are described in the following numbered clauses:

Clause 1: A method for latency balancing in a streaming scan network (SSN) on an integrated circuit, comprising: receiving, at a programmable block on the integrated circuit, an indication of a number of pipeline stages to be used for a test operation in the SSN; selecting, by the programmable block, based on the indication, a subset of a plurality of pipeline stages in the programmable block using a multiplexer; and balancing latency throughout the SSN on the integrated circuit based on the selected subset of the plurality of pipeline stages in the programmable block.

Clause 2: The method of Clause 1, wherein the selecting is based on populating one or more registers in the programmable block with the number of pipeline stages to be used for the test operation in the SSN.

Clause 3: The method of any one of Clause 1-2, wherein the programmable block includes the plurality of pipeline stages for inputs to the SSN and an additional plurality of pipeline stages for outputs from the SSN.

Clause 4: The method of any one of Clause 1-3, wherein the programmable block is configured to use the plurality of pipeline stages as either input pipeline stages or output pipeline stages.

Clause 5: The method of any one of Clause 1-4, wherein the number of pipeline stages corresponds to a number of inputs to a given processor core in the integrated circuit that has a largest number of inputs of a plurality of processor cores tested in the SSN.

Clause 6: The method of any one of Clause 1-5, wherein the programmable block is located outside of a section of the integrated circuit that is tested by the SSN.

Clause 7: The method of any one of Clause 1-6, wherein the SSN comprises a bypass path that enables test data to be transmitted through the SSN while bypassing one or more processor cores connected to a data bus of the SSN.

Clause 8: The method of any one of Clause 1-7, wherein the selecting, by the programmable block, based on the indication, the subset of the plurality of pipeline stages in the programmable block using the multiplexer enables a same test pattern to be applied to each of a plurality of identical replicated blocks tested by the SSN.

Clause 9: The method of any one of Clause 1-8, wherein the plurality of pipeline stages are implemented as a latch array.

Clause 10: A processing system comprising: one or more memories comprising processor-executable instructions; and one or more processors configured to execute the processor-executable instructions and cause the processing system to: receive, at a programmable block on an integrated circuit, an indication of a number of pipeline stages to be used for a test operation in a streaming scan network (SSN) on the integrated circuit; select, by the programmable block, based on the indication, a subset of a plurality of pipeline stages in the programmable block using a multiplexer; and balance latency throughout the SSN on the integrated circuit based on the selected subset of the plurality of pipeline stages in the programmable block.

Clause 11: The processing system of Clause 10, wherein the selecting is based on populating one or more registers in the programmable block with the number of pipeline stages to be used for the test operation in the SSN.

Clause 12: The processing system of any one of Clause 10-11, wherein the programmable block includes the plurality of pipeline stages for inputs to the SSN and an additional plurality of pipeline stages for outputs from the SSN.

Clause 13: The processing system of any one of Clause 10-12, wherein the programmable block is configured to use the plurality of pipeline stages as either input pipeline stages or output pipeline stages.

Clause 14: The processing system of any one of Clause 10-13, wherein the number of pipeline stages corresponds to a number of inputs to a given processor core in the integrated circuit that has a largest number of inputs of a plurality of processor cores tested in the SSN.

Clause 15: The processing system of any one of Clause 10-14, wherein the programmable block is located outside of a section of the integrated circuit that is tested by the SSN.

Clause 16: The processing system of any one of Clause 10-15, wherein the SSN comprises a bypass path that enables test data to be transmitted through the SSN while bypassing one or more processor cores connected to a data bus of the SSN.

Clause 17: The processing system of any one of Clause 10-16, wherein the selecting, by the programmable block, based on the indication, the subset of the plurality of pipeline stages in the programmable block using the multiplexer enables a same test pattern to be applied to each of a plurality of identical replicated blocks tested by the SSN.

Clause 18: The processing system of any one of Clause 10-17, wherein the plurality of pipeline stages are implemented as a latch array.

Clause 19: An apparatus, comprising: means for receiving, at a programmable block on an integrated circuit, an indication of a number of pipeline stages to be used for a test operation in a streaming scan network (SSN) on the integrated circuit; means for selecting, by the programmable block, based on the indication, a subset of a plurality of pipeline stages in the programmable block using a multiplexer; and means for balancing latency throughout the SSN on the integrated circuit based on the selected subset of the plurality of pipeline stages in the programmable block.

Clause 20: The apparatus of Clause 19, wherein the selecting is based on populating one or more registers in the programmable block with the number of pipeline stages to be used for the test operation in the SSN.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 212(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for latency balancing in a streaming scan network (SSN) on an integrated circuit, comprising:
   receiving, at a programmable block on the integrated circuit, an input numerical value indicating a number of pipeline stages to be used for a test operation in the SSN;
   selecting, by the programmable block, based on the input numerical value, a subset of a plurality of pipeline stages in the programmable block using a multiplexer, wherein each pipeline stage of the plurality of pipeline stages comprises a sequential element with a clock, an input, and an output; and balancing latency throughout the SSN on the integrated circuit based on the selected subset of the plurality of pipeline stages in the programmable block.

2. The method of claim 1, wherein the selecting is based on populating one or more registers in the programmable block with the number of pipeline stages to be used for the test operation in the SSN.

3. The method of claim 1, wherein the programmable block includes the plurality of pipeline stages for inputs to the SSN and an additional plurality of pipeline stages for outputs from the SSN.

4. The method of claim 1, wherein the programmable block is configured to use the plurality of pipeline stages as either input pipeline stages or output pipeline stages.

5. The method of claim 1, wherein the number of pipeline stages corresponds to a number of inputs to a given processor core in the integrated circuit that has a largest number of inputs of a plurality of processor cores tested in the SSN.

6. The method of claim 1, wherein the programmable block is located outside of a section of the integrated circuit that is tested by the SSN.

7. The method of claim 1, wherein the SSN comprises a bypass path that enables test data to be transmitted through the SSN while bypassing one or more processor cores connected to a data bus of the SSN.

8. The method of claim 1, wherein the selecting, by the programmable block, based on the indication, the subset of the plurality of pipeline stages in the programmable block using the multiplexer enables a same test pattern to be applied to each of a plurality of identical replicated blocks tested by the SSN.

9. The method of claim 1, wherein the plurality of pipeline stages are implemented as a latch array.

10. A processing system comprising:

one or more memories comprising processor-executable instructions; and one or more processors configured to execute the processor-executable instructions and cause the processing system to:

receive, at a programmable block on an integrated circuit, an input numerical value indicating a number of pipeline stages to be used for a test operation in a streaming scan network (SSN) on the integrated circuit;

select, by the programmable block, based on the input numerical value, a subset of a plurality of pipeline stages in the programmable block using a multiplexer, wherein each pipeline stage of the plurality of pipeline stages comprises a sequential element with a clock, an input, and an output; and balance latency throughout the SSN on the integrated circuit based on the selected subset of the plurality of pipeline stages in the programmable block.

11. The processing system of claim 10, wherein the selecting is based on populating one or more registers in the programmable block with the number of pipeline stages to be used for the test operation in the SSN.

12. The processing system of claim 10, wherein the programmable block includes the plurality of pipeline stages for inputs to the SSN and an additional plurality of pipeline stages for outputs from the SSN.

13. The processing system of claim 10, wherein the programmable block is configured to use the plurality of pipeline stages as either input pipeline stages or output pipeline stages.

14. The processing system of claim 10, wherein the number of pipeline stages corresponds to a number of inputs to a given processor core in the integrated circuit that has a largest number of inputs of a plurality of processor cores tested in the SSN.

15. The processing system of claim 10, wherein the programmable block is located outside of a section of the integrated circuit that is tested by the SSN.

16. The processing system of claim 10, wherein the SSN comprises a bypass path that enables test data to be transmitted through the SSN while bypassing one or more processor cores connected to a data bus of the SSN.

17. The processing system of claim 10, wherein the selecting, by the programmable block, based on the indication, the subset of the plurality of pipeline stages in the programmable block using the multiplexer enables a same test pattern to be applied to each of a plurality of identical replicated blocks tested by the SSN.

18. The processing system of claim 10, wherein the plurality of pipeline stages are implemented as a latch array.

19. An apparatus, comprising:

means for receiving, at a programmable block on an integrated circuit, an input numerical value indicating a number of pipeline stages to be used for a test operation in a streaming scan network (SSN) on the integrated circuit;

means for selecting, by the programmable block, based on the input numerical value, a subset of a plurality of pipeline stages in the programmable block using a multiplexer, wherein each pipeline stage of the plurality of pipeline stages comprises a sequential element with a clock, an input, and an output; and means for balancing latency throughout the SSN on the integrated circuit based on the selected subset of the plurality of pipeline stages in the programmable block.

20. The apparatus of claim 19, wherein the selecting is based on populating one or more registers in the programmable block with the number of pipeline stages to be used for the test operation in the SSN.

* * * * *